L. SCHOPPER.
APPARATUS FOR MEASURING TENSILE AND BREAKING STRENGTH.
APPLICATION FILED JUNE 11, 1910.
990,302.
Patented Apr. 25, 1911.
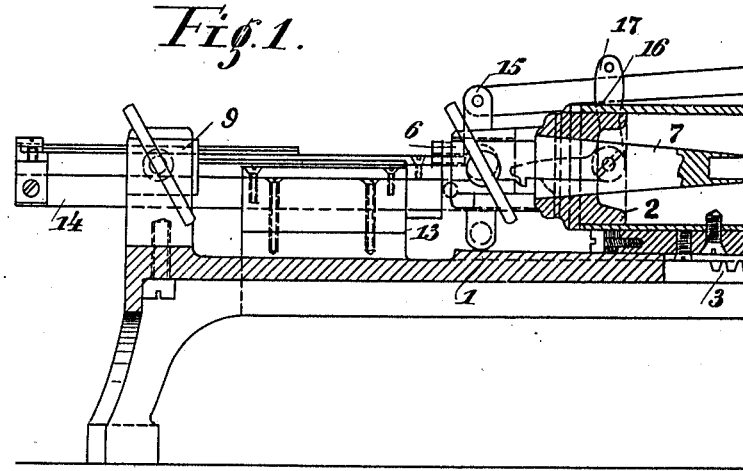
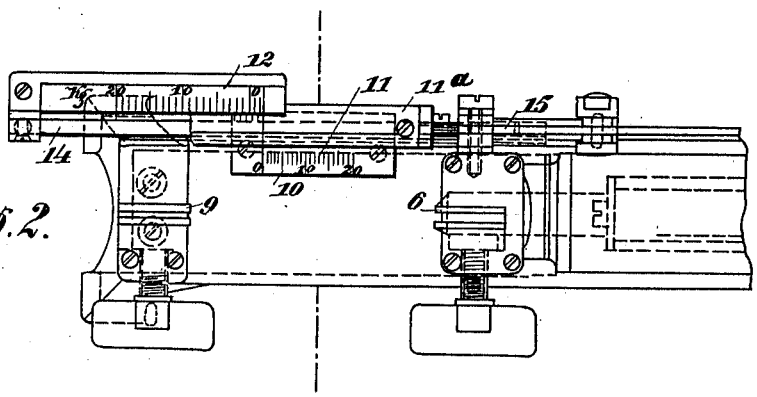
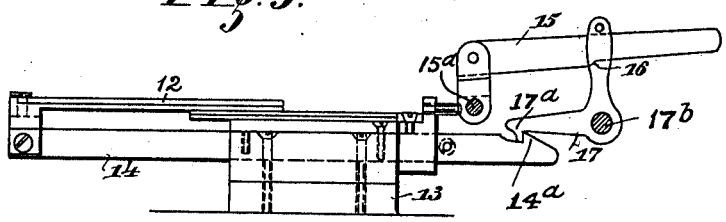
Witnesses
S. Ford
A. J. Haddan
Inventor
Louis Schopper
by R. H. Haddan
Attorney

UNITED STATES PATENT OFFICE.

LOUIS SCHOPPER, OF LEIPZIG, GERMANY.

APPARATUS FOR MEASURING TENSILE AND BREAKING STRENGTH.

990,302. Specification of Letters Patent. Patented Apr. 25, 1911.

Application filed June 11, 1910. Serial No. 566,329.

*To all whom it may concern:*

Be it known that I, LOUIS SCHOPPER, a subject of the King of Saxony, residing at Leipzig, in Germany, have invented a certain new and useful Apparatus for Measuring Tensile and Breaking Strength, of which the following is a specification.

This invention relates to apparatus for measuring tensile strength, of the class wherein means are provided for indicating the extension of the test-piece at the moment of fracture.

The object of the invention is to provide apparatus which enables the two readings (tensile strength and extension) to be obtained by an operation more rapid and simple than with the apparatus heretofore known.

The invention is illustrated in the annexed drawings in which—

Figure 1 is a longitudinal sectional elevation of part of the apparatus, Fig. 2 plan view thereof, Fig. 3 a side view of part of the mechanism and Fig. 4 is a detail to be referred to.

The apparatus comprises a slide or carriage 2 movable on a bed 1. A rod 7 movable in this slide, is attached at one end thereto by a spring 20, see Fig. 4, wherein it will be seen that one end of said spring is connected to the rod 7 and the other end to one end of a bar 21, the opposite end of said bar being threaded to receive upon it a nut 22 which is held by the spring in engagement with the end of the slide or carriage 2, thereby providing for longitudinal adjustment of said bar for the purpose of adjusting the spring 20. The bar 21 has a pin 23 extended from it which enters a slot 24 in the slide or carriage 2, to permit longitudinal adjustment of said bar and to prevent rotation of said bar by turning the nut clamp 6 for engaging one end of the test-piece. A clamp 9 for engaging the other end of the test-piece is fixed to the bed 1. A scale 10, for readings of extension, is fixed to the bed. The indicator 11 and tensile strength scale 12 are movable relatively thereto, the scale 12 being fixed to a bar 14 slidable on the bed and the slide 11ᵃ of the indicator 11 having sliding movement with some friction on the bar 14. This bar 14 can be engaged with the carriage 2 by the engagement of its hooked end 14ᵃ with the hook 17ᵃ of a bell-crank 17 pivoted at 17ᵇ to the carriage 2, so that the bar 14 and scale 12 travel through the same distance as the carriage 2 during the stretching of the test-piece. A rod 15 is pivoted at 15ᵃ to the clamping head 6 and has sliding movement on the side of the upper arm of the bell-crank 17. The rod 15 has at a suitable place along its length a shoulder 16 adapted to abut against the bell-crank when the clamp 6 is home against the end of the carriage 2 and thus rock the bell-crank and disengage the hooks 14ᵃ 17ᵃ. The slide 11ᵃ carrying the indicator 11 has abutment against some part of the clamp 6 as for instance against the pivot 15ᵃ (see Fig. 3).

A test-piece having been clamped in the clamps 6, 9, the carriage 2 is moved to the right. An outward pull of increasing force is thus exerted through the spring (not shown) on the clamp 6. The rod 14 and scale 12 move equally with the carriage 2 and the indicator 11 is carried along by friction so far therewith as the abutment of its slide 11ᵃ against the clamp 6 permits. Under the pull of the spring the test-piece suffers elongation the amount of which is indicated on the scale 10 by the indicator 11. At the moment of fracture of the test-piece, the clamp 6 flies suddenly against the end of carriage 2 thus causing the rod 15 to rock the bell-crank 17 and disengage the hooks 14ᵃ 17ᵃ so that no further movement is given to the rod 14. The indicating line of the indicator 11 then shows the extension on the scale 10 and the tensile strength on the scale 12. Both readings can be taken at a single glance, as they are in the same field of view, but since they appear on separate scales there is no liability to confusion.

What I claim as my invention and desire to secure by Letters Patent of the United States is:—

In apparatus for indicating extension and tensile strength, the combination of a bed, a fixed clamp, a movable clamp, a carriage having spring connection with the movable clamp, a bell-crank lever carried by the carriage and having a hooked arm, a draw rod adapted to engage the hooked arm, a tensile strength scale attached to said rod, a sliding indicator on said rod, adapted to have abutment against the movable clamp, an extension scale on the bed, and a rod connected to said movable clamp and adapted to have disconnecting action on the bell-crank lever.

In witness whereof I have signed this specification in the presence of two witnesses.

LOUIS SCHOPPER.

Witnesses:
 RUDOLPH FRICKE,
 CURT LEHMANN.

Copies of this patent may be obtained for five cents each, by addressing the "Commissioner of Patents, Washington, D. C."